US009719493B2

(12) United States Patent
Pineda Amo

(10) Patent No.: US 9,719,493 B2
(45) Date of Patent: Aug. 1, 2017

(54) METHOD FOR DAMPENING OSCILLATIONS IN A WIND TURBINE

(71) Applicant: Alstom Renovables España, S.L., Barcelona (ES)

(72) Inventor: Isaac Pineda Amo, Sant Cugat del Vallès (ES)

(73) Assignee: ALSTOM Renewable Technologies, Grenoble (FR)

( * ) Notice: Subject to any disclaimer, the term of this patent is extended or adjusted under 35 U.S.C. 154(b) by 447 days.

(21) Appl. No.: 14/373,022

(22) PCT Filed: Jan. 28, 2013

(86) PCT No.: PCT/EP2013/051569
§ 371 (c)(1),
(2) Date: Jul. 17, 2014

(87) PCT Pub. No.: WO2013/113656
PCT Pub. Date: Aug. 8, 2013

(65) Prior Publication Data
US 2015/0003984 A1     Jan. 1, 2015

Related U.S. Application Data

(60) Provisional application No. 61/617,838, filed on Mar. 30, 2012.

(30) Foreign Application Priority Data

Jan. 30, 2012  (EP) ..................................... 12382034

(51) Int. Cl.
*F03D 7/04*     (2006.01)
*F03D 7/02*     (2006.01)

(52) U.S. Cl.
CPC ......... *F03D 7/0296* (2013.01); *F03D 7/0224* (2013.01); *F03D 7/042* (2013.01);
(Continued)

(58) Field of Classification Search
CPC ...... F03D 7/0296; F03D 7/0224; F03D 7/024; F03D 7/042; F03D 13/20; F03D 13/25;
(Continued)

(56) References Cited

U.S. PATENT DOCUMENTS 4,420,692 A     12/1983   Kos et al.
6,695,588 B1 *   2/2004   Nielsen ................... F03D 80/00
                                                416/244 A (Continued)

FOREIGN PATENT DOCUMENTS

| DE | 102008009740 | 8/2009 |
|---|---|---|
| ES | 2163362 | 1/2002 |
| WO | WO 2011/120722 | 10/2011 |

OTHER PUBLICATIONS

International Search Report and Written Opinion for PCT/EP/2013/051569, mailed May 24, 2013, 10 pgs.

*Primary Examiner* — Christopher Verdier
(74) *Attorney, Agent, or Firm* — Dority & Manning, P.A.

(57) ABSTRACT

A method is provided for dampening oscillations in a wind turbine, the wind turbine having a tower 1, a rotor 3 arranged on the tower 1 such as to be able to rotate about an X axis, and a plurality of blades 4 with adjustable pitch mounted on the rotor. The method includes monitoring the fore-aft oscillation of the tower 1 in the direction of the X axis, at the 2nd or a higher bending mode frequency; determining a compensating torque to be applied by the rotor 3 to the tower 1 of the wind turbine about a Y axis, which is horizontal and at right angles to the X axis, for at least partly dampening the oscillation at the 2nd or higher bending mode frequency; determining for each rotor blade 4 of the wind turbine an
(Continued)

adjustment of the pitch angle suitable to generate the compensating torque about the Y axis; and adjusting the pitch angle β1, β2, β3 of at least one of the individual blades 4 to generate at least part of the compensating torque.

14 Claims, 4 Drawing Sheets

(52) U.S. Cl.
CPC ... *F05B 2260/964* (2013.01); *F05B 2270/334* (2013.01); *F05B 2270/807* (2013.01); *Y02E 10/723* (2013.01)

(58) Field of Classification Search
CPC ... Y02E 10/723; Y02E 10/727; Y02E 10/728; F05B 2260/94; F05B 2270/807; F05B 2270/808; F05B 2270/334; F05B 2240/912; F05B 2240/95; F05B 2260/964
USPC ...................................................... 416/1, 61
See application file for complete search history.

(56) References Cited

U.S. PATENT DOCUMENTS

| | | | |
|---|---|---|---|
| 2008/0012346 A1* | 1/2008 | Bertolotti | F03D 1/0658 290/55 |
| 2008/0118342 A1* | 5/2008 | Seidel | F03D 7/0224 415/1 |
| 2010/0014969 A1 | 1/2010 | Wilson et al. | |
| 2011/0115233 A1 | 5/2011 | Schroppel | |

* cited by examiner

PRIOR ART

METHOD FOR DAMPENING OSCILLATIONS IN A WIND TURBINE

The present invention relates to a method for dampening oscillations in a wind turbine, more particularly for dampening fore-aft oscillation at the $2^{nd}$ or a higher bending mode frequency.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor or through the use of a gearbox. The hub, gearbox (if present), generator and other systems are usually mounted in a nacelle on top of a wind turbine tower.

During operation of a wind turbine, the tower structure may undergo undesired vibrations, i.e. oscillatory or repeating displacements in any direction (fore-aft vibrations, side-to-side or lateral vibrations, longitudinal vibrations, torsional vibrations, . . . ) of any amplitude and of any frequency (high or low, constant or varying). These vibrations may be caused by different factors, e.g. wind acting on the tower, blades passing along the tower and locally disturbing the wind flow, vibrations transmitted from the gearbox to the tower, rotor movements, nacelle imbalances, vibrations from the hub transmitted to the tower etc.

If a tower is subjected to vibrations during a prolonged period of time, fatigue damage may result. Fatigue damage may lead to a reduced life time of the wind turbine tower and/or its components. Furthermore, the danger exists that when vibrations cause resonance in the wind turbine tower, this can lead to a potentially dangerous increase of the vibrations. A further complicating factor is that the size of wind turbines (rotor, nacelle, tower, etc.) keeps increasing. Also, as towers become higher, the effect of vibrations becomes more critical.

In the case of fore-aft vibrations or oscillations, where the tower sways back and forth in the direction parallel to the wind force and the rotor axis (X axis, see FIG. 1), it is known to dampen vibrations at the tower primary bending mode frequency ($1^{st}$ tower mode) by controlling the pitch angle of the rotor blades collectively, to cause a thrust on the nacelle and provide positive aerodynamic damping of the tower. U.S. Pat. No. 4,420,692 for example discloses such a method.

However, these methods are not effective to dampen vibrations at higher bending mode frequencies ($2^{nd}$ or higher tower modes), because the thrust on the nacelle does not affect these modes.

In wind turbines installed offshore (either floatingly arranged or on a foundation in the sea bed), the substructure and its connection with the tower also undergo vibrations, the connection region being particularly subject to fatigue.

Furthermore, in offshore turbines it is becoming apparent that the $2^{nd}$ tower mode causes more deformation on the lower part of the tower and the substructure than in onshore wind turbines, and may be more relevant than the $1^{st}$ mode; and this may also be the case in onshore turbines with very high towers.

It would thus be desirable to reduce fatigue load on the tower of wind turbines, and also on the tower substructure in the case of offshore wind turbines.

More particularly, it would be desirable to provide means to at least partly dampen $2^{nd}$ and/or higher modes in wind turbine towers and substructures, particularly of fore-aft vibrations in which the tower sways back and forth in the direction parallel to the wind force and the rotor axis.

SUMMARY

According to a first aspect of the invention, a method for dampening oscillations in a wind turbine is provided, wherein the wind turbine has a tower, a rotor arranged on the tower such as to be able to rotate about an X axis, and a plurality of blades with adjustable pitch mounted on the rotor, and said method comprises:

monitoring the fore-aft oscillation of the tower in the direction of the X axis, at the $2^{nd}$ or a higher bending mode frequency;

determining a compensating torque to be applied by the rotor to the tower of the wind turbine about a Y axis, which is horizontal and at right angles to the X axis, for at least partly dampening said oscillation at the $2^{nd}$ or higher bending mode frequency;

determining for each rotor blade of the wind turbine an adjustment of the pitch angle suitable to generate said compensating torque about the Y axis; and adjusting the pitch angle of at least one of the individual blades to generate at least part of said compensating torque.

Suitably adjusting the pitch angles to generate a compensating torque about the Y axis allows to dampen at least to some extent the oscillation at the $2^{nd}$ or higher bending mode frequency, and this reduces fatigue load on the tower, and on the tower substructure in at least offshore wind turbines.

According to another aspect, the invention relates to a wind turbine comprising a tower, a rotor arranged on the tower such as to be able to rotate about an X axis, a plurality of blades with adjustable pitch mounted on the rotor, and pitch actuators for adjusting the pitch angle of each blade, further comprising sensors for monitoring the fore-aft oscillation of the tower in the direction of the X axis, at the $2^{nd}$ or a higher bending mode frequency, and controllers for determining a compensating torque to be applied by the rotor to the tower of the wind turbine about a Y axis, which is horizontal and at right angles to the X axis, for at least partly dampening said oscillation at the $2^{nd}$ or higher bending mode frequency, and for determining for each rotor blade of the wind turbine an adjustment of the pitch angle suitable to generate said compensating torque about the Y axis.

The pitch actuators may therefore be caused to adjust the pitch angle of at least one of the individual blades to generate at least part of the compensating torque.

In some embodiments the wind turbine may comprise a frame rotatably mounted on the tower to rotatably support the rotor, said frame comprising a hollow forward extension on which the rotor hub is mounted, wherein the compensating torque to be applied by the rotor to the tower is transmitted from the rotor hub to the supporting frame and from the frame to the tower.

Since the compensating torque may be transmitted directly from the rotor hub to the supporting frame (e.g. through appropriate bearings) and from the frame to the tower (e.g. through the yaw system), loads on the power train and torque losses are reduced; this configuration may therefore provide a particularly efficient compensation.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
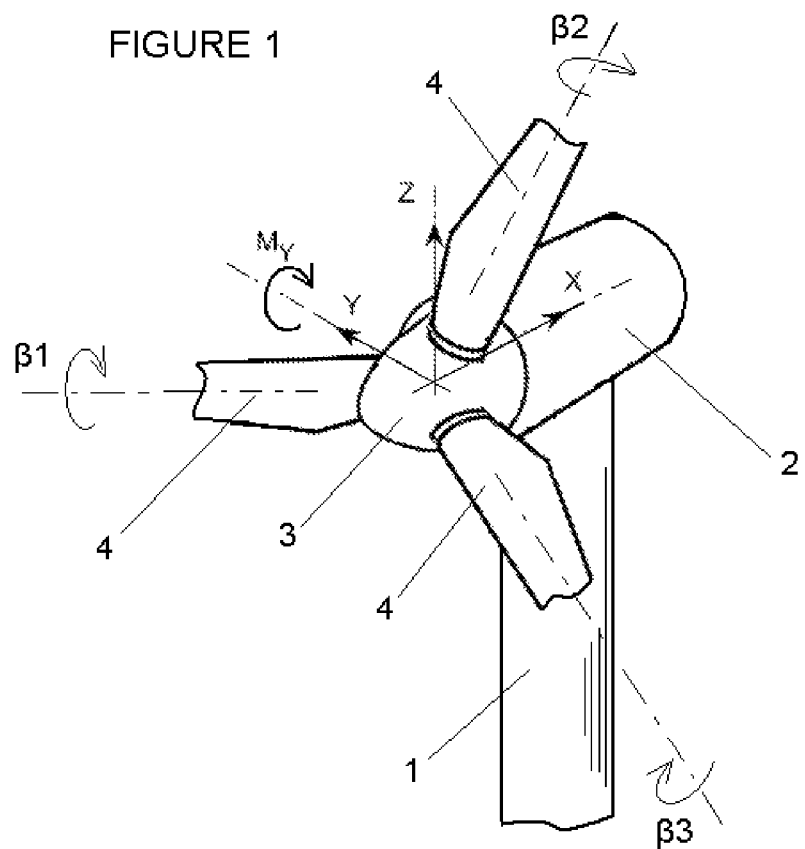
FIG. 1 shows very schematically some parts of a wind turbine.

FIG. 1 shows a very schematic representation of parts of a wind turbine: it comprises a tower 1 and a rotor 3 arranged on the tower 1 such as to be able to rotate about an X axis.

On the rotor 3 are mounted a plurality of blades 4, in this case three, each with an adjustable pitch angle ($\beta 1$, $\beta 2$ and $\beta 3$ respectively) which can be adjusted during the wind turbine operation.

The rotor 3 may be rotatably supported at the top of the tower 1 on a structure or frame, which may be mounted on a yaw system (not shown) allowing the assembly to face into the wind as it changes direction, and may be housed in a nacelle 2 together with other parts such as generator, controller, gearbox, etc.

Figure 4A:
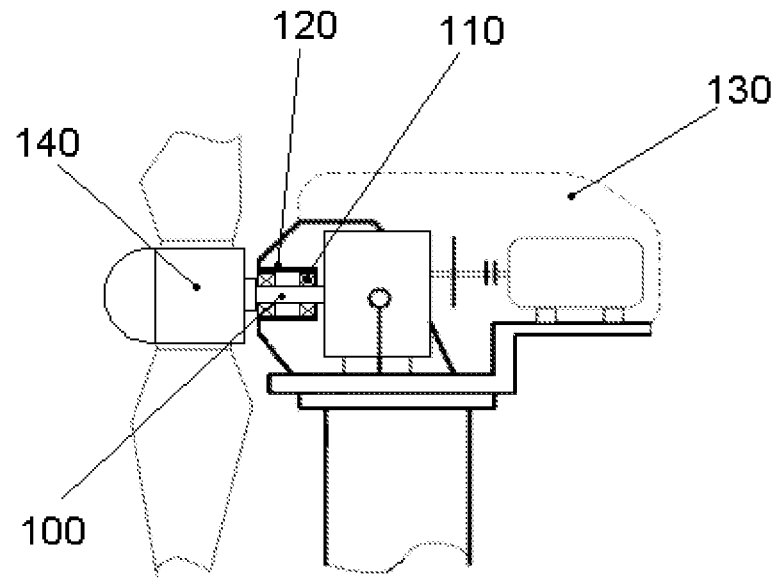
FIGS. 4a and 4b show two different wind turbine configurations known in the prior art to which embodiments of the invention may be applied.
Figure 4B:
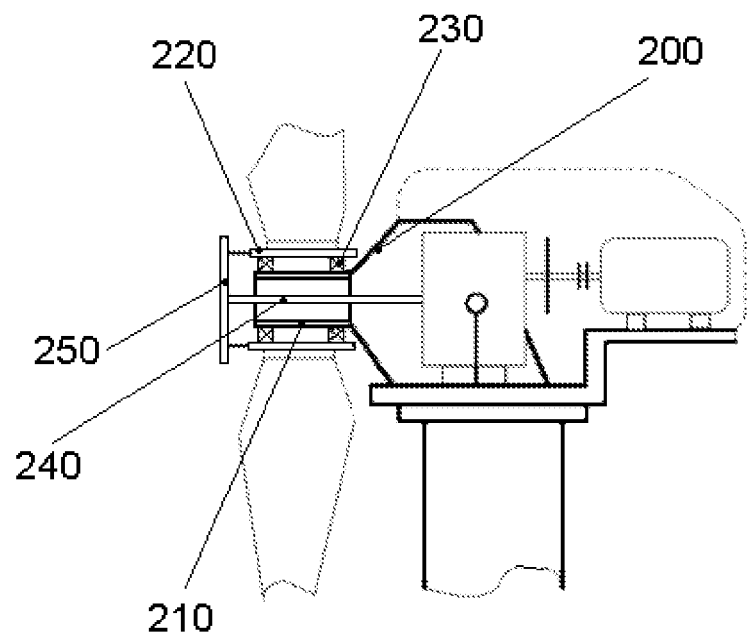

FIGS. 4a and 4b show two wind turbine configurations known in the prior art: in conventional wind turbines such as that of FIG. 4a, a rotor shaft 100 is supported in a bearing arrangement 110 in a supporting structure 120 in the nacelle 130, and carries the whole of the rotor 140; in the alternative configuration of FIG. 4b, disclosed for example in ES2163362 or in WO2011120722A1, a supporting frame 200 may comprise a hollow forward extension 210 on which the rotor hub 220 is mounted through a bearing arrangement 230, while the rotor shaft 240 may run through the hollow extension 210 and may be rotatably coupled to the hub 220 at a distal end by means of a suitable coupling element 250; in this case, the weight of the rotor hub and blades is not supported by the rotor shaft but directly by the frame 200-210.

FIG. 1 of WO2011120722A1 and the corresponding part of the specification (page 1, line 25 to page 2, line 8) provide a description of a wind turbine with the configuration of FIG. 4b.

Other known parts and details of the wind turbine are not necessary for the following description and are therefore not shown or explained.

Due to the effect of the turbulent wind and to other factors, the wind turbine tower 1 is subject to vibrations or oscillations; in particular, it is subject fore-aft oscillations in which the tower sways back and forth in the direction parallel to the wind force and the rotor axis X (in other words, oscillations in the vertical plane defined by axes X and Z in FIG. 1). Oscillations result in fatigue loads on the tower, and also on the substructure of the tower in the case of offshore wind turbines.

Fore-aft oscillations may comprise $1^{st}$ bending mode and higher bending modes frequencies; although the amplitude of the $1^{st}$ mode is generally greater than that of the $2^{nd}$ or higher modes, the $2^{nd}$ mode may be particularly important in some cases, such as offshore wind turbines or onshore turbines with very high towers, where it may cause relevant deformation on the lower part of the tower and the substructure. It is therefore desirable to dampen the $2^{nd}$ mode component of the fore-aft oscillations.

Figure 2A:
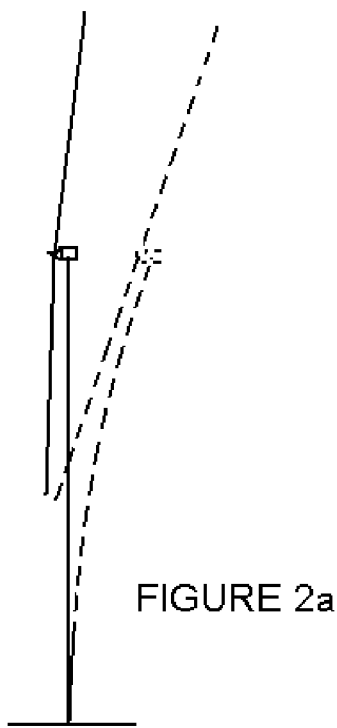
FIGS. 2a, 2b are schematic drawings illustrating the modal shape of the $1^{st}$ and $2^{nd}$ tower modes.
Figure 2B:
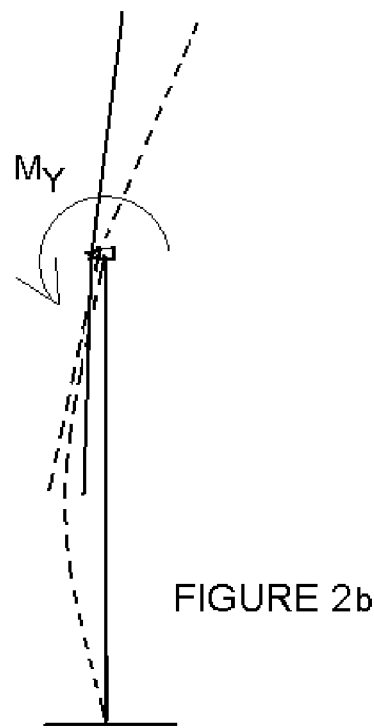

FIGS. 2a, 2b are drawings simulating very schematically the modal shape of the $1^{st}$ and $2^{nd}$ modes in a wind turbine, respectively. From the modal shapes it may be appreciated that while in the $1^{st}$ mode the upper part of the tower and the nacelle will be subject to a relatively large displacement in the direction of the X axis, in the second mode such zones of the wind turbine will rather be subject to rotation, while the greater displacement in the direction of the X axis will be at a certain height along the tower.

According to embodiments of the invention, fore-aft oscillations, and in particular the $2^{nd}$ mode component thereof, may be dampened by exerting on the tower a suitable compensating torque $M_Y$ about the Y axis, as shown in FIGS. 1 and 2b, i.e. by exerting a torque that opposes the rotation of the nacelle and upper part of the tower due to the $2^{nd}$ mode.

The compensating torque $M_Y$ may be exerted on the tower 1 by the rotor 3, through its supporting frame, by adjusting the pitch angles $\beta 1$, $\beta 2$ and $\beta 3$ of the individual blades 4 depending on the $2^{nd}$ mode oscillation, which may be monitored using suitable measurements on the wind turbine.

Figure 3:
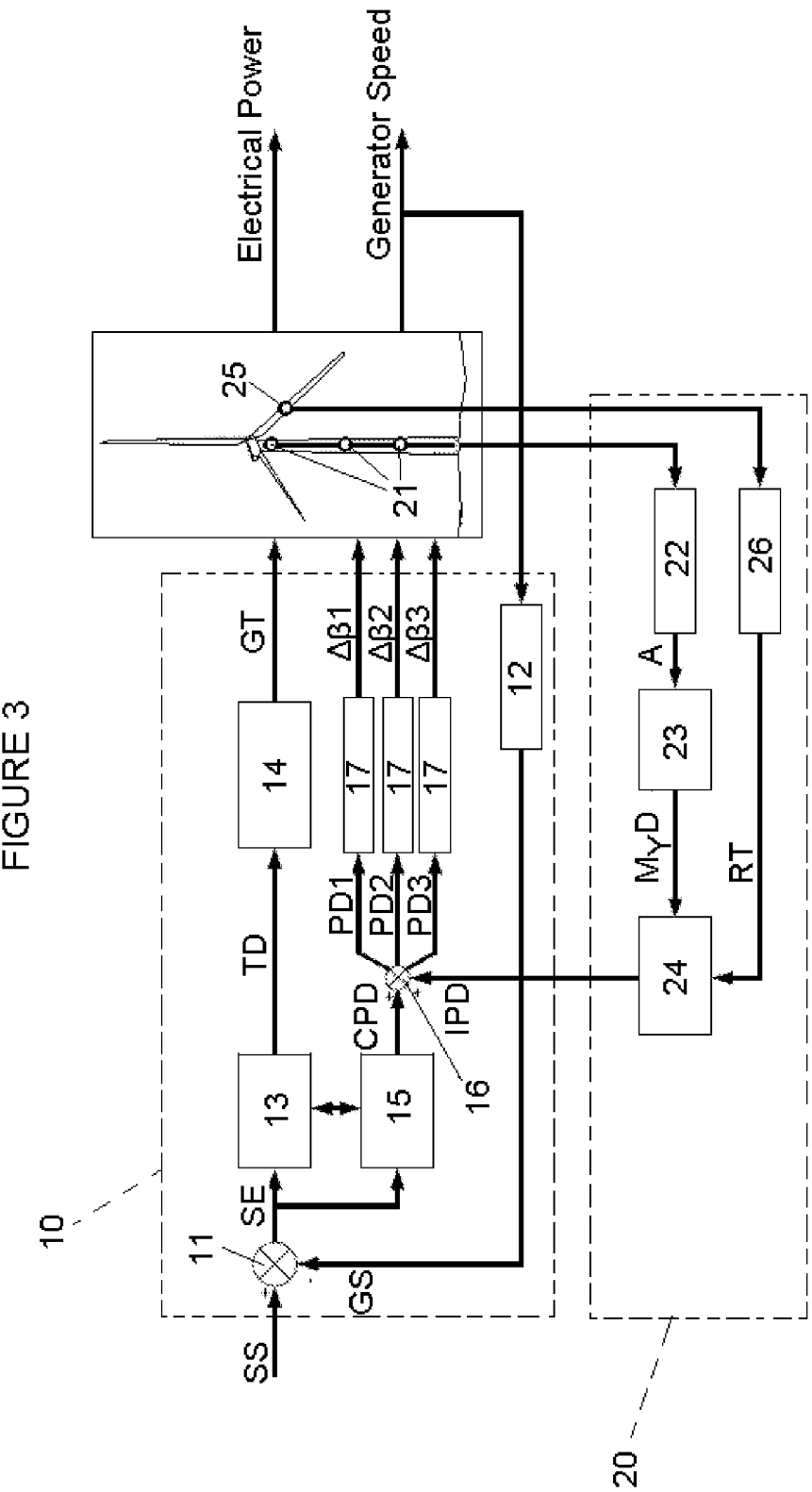
FIG. 3 is a block diagram related to the wind turbine control and showing how the adjustment of the rotor blade angles is performed, according to an embodiment of the invention, for dampening oscillations of the wind turbine tower.

FIG. 3 is a schematic block diagram of the wind turbine control system, showing how the adjustment of the rotor blade angles is determined and performed, according to an embodiment of the invention, for dampening the $2^{nd}$ tower mode of the wind turbine tower.

The block diagram of FIG. 3 shows a generator speed controller 10 with two control loops, generator torque and pitch angle.

A set speed SS is inputted to a comparator device 11 and compared to the generator speed GS measured by a speed sensor 12 in the wind turbine, to provide a speed error signal SE.

This signal SE is provided to a generator torque controller 13 and to a collective pitch controller 15, in two control loops which, depending on the wind speed, may operate alternatively, or in a combined manner, to control the wind turbine: in one loop, generator torque controller 13 determines the torque demand TD necessary to correct the generator speed, and this torque demand TD is provided to the electrical converter 14, which applies a suitable torque GT to the generator in order to follow TD; in the other loop, collective pitch controller 15 determines a collective pitch demand CPD, i.e. a suitable pitch angle for all the rotor blades in order to maintain the rated power.

According to embodiments of the invention, the collective pitch demand CPD is provided to a comparator device 16 which also receives an individual pitch demand signal IPD for each blade, calculated as will be explained in the following. The comparator device 16 outputs three signals PD1, PD2, PD3, one for each of the rotor blades, towards three corresponding pitch actuators 17, which accordingly apply corresponding pitch angle adjustments $\Delta\beta 1$, $\Delta\beta 2$, $\Delta\beta 3$ to the rotor blades.

FIG. 3 also shows a $2^{nd}$ bending mode damping controller 20, according to embodiments of the invention. Suitable sensors, such as accelerometers 21, may be arranged at different positions to monitor the fore-aft oscillation of the wind turbine tower 1; a measurement module 22 obtains the accelerations A at different heights of the tower 1, the accelerations A being representative of the amplitude and sense of the oscillations, and feeds them to a compensating torque module 23, which determines the compensating torque $M_Y$ that needs to be applied to the tower about the Y axis for at least partly compensating said accelerations and thus dampening the oscillation at the $2^{nd}$ bending mode frequency.

The Y-axis torque demand $M_YD$ determined by module 23 is employed in an individual pitch controller 24 in order to determine the pitch demand IPD for each rotor blade of the wind turbine, i.e. the pitch angle adjustment that needs to be applied to each rotor blade to generate said compensating torque about the Y axis.

As explained earlier, the individual pitch demand IPD for each rotor blade is fed to the comparator device 16, to be combined with the collective pitch demand CPD to generate the three pitch demand signals PD1, PD2, PD3 for the three rotor blades.

As a result, each pitch actuator 17 may apply to its corresponding blade 4 a pitch angle adjustment $\Delta\beta1$, $\Delta\beta2$, $\Delta\beta3$.

In embodiments of the invention, the step performed by controller 24 of determining for each rotor blade the required adjustment of the pitch angle (pitch demand IPD) comprises comparing the compensating torque $M_YD$ determined in module 23 with the torque actually acting on the rotor hub.

This rotor hub torque RT may be determined by means of blade load measurements, for example load sensors 25 arranged on the blades and providing blade load signals to a measurement module 26, from which the data are fed to individual pitch controller 24. Alternatively, the actual torque acting on the rotor hub may be determined with torque measurements on the hub support frame.

In other embodiments the comparison between the compensating torque $M_YD$ determined in module 23 and the torque actually acting on the rotor hub may be made in module 23 itself: in this case the signal from measurement module 26 would be fed to module 23.

It will be appreciated that in embodiments of the method according to the invention an additional pitch demand is added to the collective pitch controller in order to fulfil both requirements, speed control and tower fatigue load reduction; this can be done as both controllers may be independent and decoupled and they do not interact with each other.

The positions at which the accelerometers 21, or other suitable sensors to monitor the amplitude and sense of fore-aft oscillations, may be arranged on the tower 1 and/or the nacelle 2 and/or on the rotor supporting frame depend on each wind turbine, and particularly on the structure of the tower and/or substructure.

According to embodiments of the invention, the positions of the wind turbine where maximum amplitude at the $2^{nd}$ bending mode frequency is expected are determined, by running a simulation of the tower behaviour, or of the tower and substructure behaviour. Sensors 21 are then arranged on the tower at the positions where maximum amplitude is expected.

Alternatively or additionally, inclinometers may be arranged on the nacelle, on the rotor supporting frame or on the upper part of the tower, to measure the rotation thereof and thus obtain a measure of the oscillation.

Sensors 25 for obtaining a measure of the rotor hub torque may be optical fibre sensors, for example fibre Bragg grating (FBG). Use of strain gauges, as well as other known means of measuring or determining blade root loads or rotor hub loads, is also possible.

For example, a known method that can be employed to determine the rotor hub load is to estimate the load at the root of the blade by placing sensors to measure the load at two different positions along the blade (for example at distances from the root of about 20% and 30% of the total blade length), and use the measurements for extrapolating the load at the blade root.

When operating a wind turbine, embodiments of the method according to the invention may be employed to compensate at least part of the $2^{nd}$ bending mode of the tower in the fore-aft direction. The degree of compensation may vary from time to time, depending on other circumstances that may require different pitch angle adjustments. A compromise may also be reached, e.g. applying angle adjustments that are smaller than those determined needed for compensating 100% of $2^{nd}$ mode fore-aft oscillation, (thus compensating the oscillation only in part), in order to allow another effect to be achieved at the same time, for example compensating wind shear.

Overlapping several pitch angle adjustments during the wind turbine operation is also possible, e.g. at different frequencies: for example, pitch angles may be adjusted at one frequency in order to compensate wind shear, and at another frequency, with different adjustment values, in order to compensate $2^{nd}$ bending mode oscillation.

It will be understood that similar methods may be applied during a wind turbine operation for dampening the oscillations of the wind turbine tower at the $3^{rd}$ or higher bending mode frequencies if desired, by arranging sensors 21 in the positions where maximum amplitudes are expected for such modes, and programming controllers 23, 24 to determine the compensation torque $M_YD$ and required individual pitch adjustments IPD accordingly.

The difference between the frequencies of the different modes (usually clearly differentiated, for example 0.3 Hz for the $1^{st}$ mode and 1.5 Hz for the $2^{nd}$ mode) may allow to determine to which tower mode is associated the oscillation measured by a sensor at a particular time, for example by the use of pass-band filters (not shown) to filter the signals from the accelerometers 21 or other suitable sensors.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method for dampening oscillations in a wind turbine, the wind turbine having a tower, a rotor arranged on the tower such as to be able to rotate about an X axis, and a plurality of rotor blades with adjustable pitch mounted on the rotor, the method comprising:
monitoring a fore-aft oscillation of the tower in the direction of the X axis, at a $2^{nd}$ or a higher bending mode frequency of the tower;
determining a compensating torque to be applied by the rotor to the tower of the wind turbine about a Y axis, which is horizontal and at right angles to the X axis, for at least partly dampening the oscillation at the $2^{nd}$ or higher bending mode frequency;

determining for each rotor blade an adjustment of a pitch angle suitable to generate the compensating torque about the Y axis; and adjusting the pitch angle of at least one of the rotor blades to generate at least part of the compensating torque.

2. A method as claimed in claim 1, wherein the step of monitoring the fore-aft oscillation of the tower comprises measuring an amplitude and sense of the oscillation at least at one position along a height of the tower.

3. A method as claimed in claim 2, wherein the amplitude and sense of the oscillation is measured at a plurality of positions along the height of the tower.

4. A method as claimed in claim 2, comprising theoretically determining by simulation or calculation at least one position of the tower where the $2^{nd}$ or higher bending mode oscillation is expected to be maximum, and measuring the amplitude and sense of the oscillation at least at the at least one expected maximum oscillation position.

5. A method as claimed in claim 2, wherein the amplitude and sense of the oscillation is also measured on a wind turbine nacelle.

6. A method as claimed in claim 1, wherein monitoring the fore-aft oscillation of the tower is carried out using accelerometers.

7. A method as claimed in claim 1, wherein monitoring the fore-aft oscillation of the tower in the direction of the X axis, at the $2^{nd}$ or a higher bending mode frequency, comprises using sensors, and filtering the signals from the sensors by means of at least one pass-band filter.

8. A method as claimed in claim 1, wherein the step of determining for each rotor blade an adjustment of the pitch angle comprises comparing the compensating torque determined in the previous step with the torque acting on a rotor hub.

9. A method as claimed in claim 8, wherein the torque acting on the rotor hub is determined with blade load measurements.

10. A method as claimed in claim 8, wherein the torque acting on the rotor hub is determined with torque measurements on a hub support frame.

11. A method as claimed in claim 1, wherein the steps of the method for dampening oscillations are overlapped with further rotor blade pitch angle adjustment operations.

12. A method as claimed in claim 11, wherein the steps of the method for dampening oscillations are performed at a different frequency from that of at least one further rotor blade pitch angle adjustment operation.

13. A wind turbine, comprising:

a tower, a rotor arranged on the tower such as to be able to rotate about an X axis, a plurality of rotor blades with adjustable pitch angle mounted on the rotor, and pitch actuators for adjusting the pitch angle of each blade, and further comprising sensors for monitoring a fore-aft oscillation of the tower in the direction of the X axis, at a $2^{nd}$ or a higher bending mode frequency of the tower, and controllers for determining a compensating torque to be applied by the rotor to the tower of the wind turbine about a Y axis, which is horizontal and at right angles to the X axis, for at least partly dampening the oscillation at the $2^{nd}$ or higher bending mode frequency, and for determining for each rotor blade an adjustment of the pitch angle suitable to generate the compensating torque about the Y axis.

14. A wind turbine as claimed in claim 13, further comprising a frame rotatably mounted on the tower to rotatably support the rotor, the frame comprising a hollow forward extension on which a rotor hub is mounted, wherein the compensating torque to be applied by the rotor to the tower is transmitted from the rotor hub to the frame and from the frame to the tower.

* * * * *